(12) United States Patent
Roh et al.

(10) Patent No.: US 9,833,741 B2
(45) Date of Patent: Dec. 5, 2017

(54) SUBMERGED MEMBRANE FILTRATION SYSTEM USING RECIPROCATING MEMBRANE

(71) Applicant: DOOSAN HEAVY INDUSTRIES & CONSTRUCTION CO., LTD., Changwon-si (KR)

(72) Inventors: Hyung Keun Roh, Seoul (KR); Jaeho Ho, Tampa, FL (US)

(73) Assignee: DOOSAN HEAVY INDUSTRIES & CONSTRUCTIONS CO., LTD., Changwon-si (KR)

(*) Notice: Subject to any disclaimer, the term of this patent is extended or adjusted under 35 U.S.C. 154(b) by 157 days.

(21) Appl. No.: 14/833,527

(22) Filed: Aug. 24, 2015

(65) Prior Publication Data
US 2017/0057853 A1   Mar. 2, 2017

(51) Int. Cl.
*B01D 63/00* (2006.01)
*B01D 61/00* (2006.01)
(Continued)

(52) U.S. Cl.
CPC ......... *B01D 61/147* (2013.01); *B01D 61/145* (2013.01); *B01D 63/16* (2013.01); *C02F 1/444* (2013.01); *B01D 2311/04* (2013.01); *B01D 2311/25* (2013.01); *B01D 2311/2642* (2013.01); *B01D 2311/2688* (2013.01);
(Continued)

(58) Field of Classification Search
CPC .. B01D 61/145; B01D 65/02; B01D 67/0016; B01D 69/08; B01D 2315/06; B01D 63/16; B01D 61/147; C02F 9/00; C02F 9/144; C02F 1/5281; C02F 3/28
See application file for complete search history.

(56) References Cited

U.S. PATENT DOCUMENTS

| 4,867,883 A | 9/1989 | Daigger et al. |
| 4,952,317 A * | 8/1990 | Culkin .......... B01D 63/16 210/321.67 |

(Continued)

FOREIGN PATENT DOCUMENTS

| JP | H01-203004 A | 8/1989 |
| JP | H03-188926 A | 8/1991 |

(Continued)

OTHER PUBLICATIONS

Anusha Kola et al., "Application of low frequenccytransverse vibration on fouling limitation in submerged hollow fbre membranes"; Journal of Membrane Science 409-410 (2012)54-65.*
(Continued)

*Primary Examiner* — Ana Fortuna
(74) *Attorney, Agent, or Firm* — Sughrue Mion, PLLC

(57) ABSTRACT

Provided is a reciprocating submerged membrane filtration apparatus including: a membrane tank comprising a submerged membrane and configured to intake influent wastewater to be treated, the influent wastewater being filtered through the submerged membrane to produce treated water; and a reciprocation apparatus configured to move the membrane to create an inertia force which shakes foulants off from the submerged membrane under oxygen-deficient conditions, wherein the submerged membrane comprises a microfiltration (MF) membrane or an ultrafiltration (UF) membrane.

13 Claims, 18 Drawing Sheets

(51) Int. Cl.
*B01D 65/00* (2006.01)
*C02F 1/44* (2006.01)
*B01D 61/14* (2006.01)
*B01D 63/16* (2006.01)
B01D 21/01 (2006.01)
C02F 11/04 (2006.01)
C02F 101/10 (2006.01)
C02F 3/12 (2006.01)
C02F 3/28 (2006.01)
C02F 5/02 (2006.01)

(52) U.S. Cl.
CPC ...... *B01D 2315/04* (2013.01); *B01D 2315/06* (2013.01); *C02F 3/1273* (2013.01); *C02F 3/286* (2013.01); *C02F 5/02* (2013.01); *C02F 11/04* (2013.01); *C02F 2101/106* (2013.01); *C02F 2303/16* (2013.01); *C02F 2303/20* (2013.01); *Y02W 10/15* (2015.05)

(56) References Cited

U.S. PATENT DOCUMENTS

| | | | | |
|---|---|---|---|---|
| 7,122,121 | B1* | 10/2006 | Ji | B01D 61/18 210/321.67 |
| 7,294,274 | B2* | 11/2007 | Kirker | B01D 63/08 210/106 |
| 7,455,765 | B2* | 11/2008 | Elefritz | C02F 3/006 210/143 |
| 8,287,733 | B2* | 10/2012 | Nick | C02F 3/1273 210/259 |
| 2005/0023219 | A1* | 2/2005 | Kirker | B01D 63/08 210/636 |
| 2005/0077227 | A1* | 4/2005 | Kirker | B01D 63/02 210/321.69 |
| 2006/0108289 | A1* | 5/2006 | Steele | B01D 61/022 210/651 |
| 2010/0116736 | A1* | 5/2010 | Wiemers | B01D 61/022 210/636 |
| 2012/0282677 | A1* | 11/2012 | Brod | C12M 21/02 435/257.1 |
| 2015/0034552 | A1* | 2/2015 | Pickett | C02F 3/006 210/610 |
| 2016/0264439 | A1* | 9/2016 | Goldstein | C02F 9/00 |
| 2017/0057853 | A1* | 3/2017 | Roh | C02F 9/00 |

FOREIGN PATENT DOCUMENTS

| | | |
|---|---|---|
| JP | H04-30956 A | 2/1992 |
| JP | H04-260421 A | 9/1992 |
| JP | H05-220358 A | 8/1993 |
| JP | H06-070893 A | 10/1994 |
| JP | H08-257372 A | 10/1996 |
| JP | H09-136099 A | 5/1997 |
| JP | H09-308895 A | 12/1997 |
| JP | 10-036925 A | 2/1998 |
| JP | 10-309190 A | 11/1998 |
| JP | 11-128982 A | 5/1999 |
| JP | 11-319881 A | 11/1999 |
| JP | 11-319889 A | 11/1999 |
| JP | 2000-094000 A | 4/2000 |
| JP | 2000-189769 A | 7/2000 |
| JP | 2000-325982 A | 11/2000 |
| JP | 2001-058198 A | 3/2001 |
| JP | 2002-086195 A | 3/2002 |
| JP | 2005-522311 A | 7/2005 |
| JP | 2006-035154 A | 2/2006 |
| JP | 2007-319851 A | 12/2007 |
| JP | 2009-148714 A | 7/2009 |
| JP | 2010-041954 A | 2/2010 |
| JP | 2012-135734 A | 7/2012 |
| JP | 2013-523450 A | 6/2013 |
| JP | 2014-008501 A | 1/2014 |
| KR | 10-0834712 B1 | 6/2008 |
| KR | 10-2009-0080625 A | 7/2009 |
| KR | 10-1430104 B1 | 8/2014 |
| KR | 10-2012-0051678 A | 2/2016 |
| WO | 03/084645 A1 | 10/2003 |
| WO | 2011/130392 A1 | 10/2011 |
| WO | 2014/058789 A1 | 4/2014 |

OTHER PUBLICATIONS

Tian Li et al, "Fouling control of submerged hollow fibre membranes by vibrations", Journal of Membrane Science 427 (2013) 230-239.*
Japanese Office Action dated Dec. 7, 2016 from the Japanese Patent Office in counterpart application No. 2016-036675.
PCT Search Report dated May 24, 2016 in corresponding PCT Application No. PCT/KR2016/000501.

* cited by examiner

SUBMERGED MEMBRANE FILTRATION SYSTEM USING RECIPROCATING MEMBRANE

BACKGROUND

1. Field

Apparatuses consistent with exemplary embodiments relate to a membrane filtration system for treating wastewater, and more particularly to a membrane filtration system having increased filtration and nutrient removal performance as a result of employing the repeated back and forth motion (hereinafter referred to as "reciprocating motion" or "reciprocation") of a submerged membrane instead of membrane scouring that is used in a submerged membrane filtration system of the related art.

2. Description of the Related Art

Several examples of membrane filtration systems utilize membrane filtration processes to remove contaminants from wastewater. Several modified membrane processes can be used alone or in series for improved removal of contaminants in membrane filtration. Known membrane filtration systems also use low-pressure microfiltration (MF) or ultrafiltration (UF) membranes as a physical barrier for complete solid-liquid separation. The membranes are typically installed in a filtration tank. Membrane air scouring is of utmost importance in submerged membrane filtration operation to prevent severe and rapid membrane fouling. By way of these known techniques, membrane filtration systems can achieve secondary and tertiary wastewater treatment.

One advantage of known membrane filtration systems is the direct introduction of tertiary quality effluent to the treatment of domestic or industrial wastewater. Another reason for the growing interest in membrane filtration technology is its smaller footprint compared to conventional treatment processes. For example, using the membrane filtration systems, a treatment plant could potentially double the capacity of the treatment plant without increasing the overall footprint of the plant. Membrane filtration technology is not only limited to domestic wastewater, but the membrane filtration technology can also be applied to treat industrial wastewater for reuse.

An example of a membrane filtration system is disclosed in U.S. Pat. No. 4,867,883 to Daigger. The Daigger reference discloses a high-rate biological wastewater treatment process for removing organic matter, phosphorus and nitrogen nutrients from municipal wastewater. Another membrane filtration system is disclosed is U.S. Pat. No. 8,287,733 to Nick et al. The Nick reference discloses a system utilizing first and second anoxic basins and first and second aerobic basins and also discloses the use of a membrane chamber for housing a plurality of membrane tanks.

One common drawback of known membrane filtration systems is membrane fouling. The membrane fouling occurs when soluble and particulate materials accumulate on the membrane surface. When the membrane fouling occurs, there is either a marked decline in permeate passing through the membrane or an increase in the transmembrane pressure. In either event, the result is a dramatic reduction in system performance. Membrane fouling is especially problematic in membrane filtration systems given that the membrane filtration systems generally operate with higher mixed liquor suspended solids (MLSS).

One solution to membrane fouling is air scouring. Vigorous air scouring allows for stable flux operation without rapid and permanent fouling and especially cake layer buildup. Given the higher MLSS concentrations at which membrane filtration systems operate, frequent maintenance cleanings and out-of-tank cleanings are also important to maintain membrane performance in terms of fouling and permeability. Air scouring is not optimal as it is energy intensive. In membrane filtration systems, energy consumption is considerably high due to the additional air scouring for the membrane. In addition, because air scouring is a process of vigorously blowing air, it is unsuitable for combination with processing units suitable for oxygen-deficient conditions such as anoxic or anaerobic conditions or low-speed agitation conditions, and thus there are many limits to the use of air scouring in various applications.

SUMMARY

Thus, there exists a need in the art for improved membrane filtration systems that eliminate or reduce membrane fouling and that do not rely upon air scouring. One or more exemplary embodiments are aimed at fulfilling these and other needs in the art.

In accordance with an aspect of an exemplary embodiment, there is provided a membrane reciprocation system including: a submerged membrane; and a mechanical reciprocation apparatus configured to reciprocate the submerged membrane to produce an inertia force to thereby reduce fouling of the submerged membrane.

The mechanical reciprocation apparatus may be configured to reciprocate the submerged membrane back and forth to shake foulants off from the surface of the submerged membrane.

The mechanical reciprocation apparatus may include a rotor connected to a sliding frame via a shaft, and a sliding frame connected to the submerged membrane, and may be configured such that the sliding frame reciprocates the submerged membrane.

The mechanical reciprocation apparatus may include a low RPM motor connected to a pulley via a belt and configured to rotate the rotator to thereby convert rotational motion into reciprocating motion of the sliding frame through the shaft.

The sliding frame may include: a damper provided between the frame and the shaft so as to reduce shock load caused by reciprocating motion; and linear bearings and pillow block supports, which are configured such that the sliding frame can move along a sliding rail.

In accordance with an aspect of another exemplary embodiment, there is provided a membrane bioreactor system including: a biological treatment train for receiving influent to be treated and producing treated wastewater; a membrane tank containing a submerged membrane and configured such that the treated wastewater from the biological treatment train is filtered through the submerged membrane to produce effluent; and a mechanical reciprocation apparatus configured to reciprocate the submerged membrane so as to reduce fouling of the submerged membrane and provide oxygen-deficient conditions in the membrane tank.

The mechanical reciprocation apparatus may include a rotor connected to a sliding frame via a shaft, and a sliding frame connected to the submerged membrane, and may be configured such that the sliding frame reciprocates the submerged membrane.

The mechanical reciprocation apparatus may include a low RPM motor connected to a pulley via a belt and configured to rotate the rotator to thereby convert rotational motion into reciprocating motion of the sliding frame through the shaft.

The biological treatment train may include: an anaerobic treatment tank for biologically treating influent in the absence of dissolved oxygen; an anoxic treatment tank for denitrifying treated wastewater from the anaerobic treatment tank under oxygen-depleted conditions; and an aerobic treatment tank for biologically treating the treated wastewater from the anoxic treatment tank in the presence of dissolved oxygen.

The membrane bioreactor system may further include: an activated sludge return line for delivering activated sludge from the membrane tank to the anoxic treatment tank; and an internal recycle line for delivering a portion of the activated sludge from the anoxic treatment tank to the anaerobic treatment tank.

The membrane bioreactor system may further include: an activated sludge return line for delivering activated sludge from the membrane tank to the anaerobic treatment line; and an internal recycle line for delivering a portion of the activated sludge from the aerobic treatment tank to the anoxic treatment tank.

The biological treatment train may include: an anoxic treatment tank for denitrifying influent under oxygen-deficient conditions; an anaerobic treatment tank for biologically treating treated wastewater from the anoxic treatment tank in the absence of dissolved oxygen; and an aerobic treatment tank for biologically treating the treated wastewater from the anaerobic treatment tank in the presence of dissolved oxygen.

The membrane bioreactor system may further include an activated sludge return line for delivering activated sludge from the membrane tank to the anoxic treatment tank.

The biological treatment train may include: an anoxic treatment tank for denitrifying influent under oxygen-deficient conditions; and an aerobic treatment tank for biologically treating treated wastewater from the anoxic treatment tank in the presence of dissolved oxygen.

The membrane bioreactor system may further include an activated sludge return line for delivering activated sludge from the membrane tank to the anoxic treatment tank.

In accordance with an aspect of yet another exemplary embodiment, there is a reciprocating submerged membrane filtration system including: a membrane tank including a submerged membrane and configured such that influent wastewater to be treated is filtered through the submerged membrane to produce treated water; and a mechanical reciprocation apparatus configured to reciprocate the membrane back and forth to create an inertia force that shakes foulants off from the surface of the membrane under oxygen-deficient conditions, wherein the membrane is a microfiltration (MF) membrane or an ultrafiltration (UF) membrane.

The membrane may be reciprocated back and forth at a frequency of 2 Hz or less and an amplitude of 10 mm or more. Preferably, the membrane may be reciprocated back and forth at a frequency of 1 Hz or less and an amplitude of 30 mm or more. More preferably, the membrane may be reciprocated back and forth at a frequency of 0.5 Hz or less and an amplitude of 40 mm or more.

The membrane may be reciprocated back and forth at a frequency of 0.2-0.5 Hz under low-speed agitation conditions, and a flocculant inlet may be disposed upstream of the membrane tank so that both flocculation by the flocculant and filtration will occur in the single membrane tank.

The reciprocating submerged membrane filtration system may further include a selenium reduction tank disposed upstream of the membrane tank and configured to biologically treat wastewater containing selenium oxide under anoxic or anaerobic conditions to produce intermediate treated water and feed the intermediate treated water to the membrane tank.

The reciprocating submerged membrane filtration system may further include: a flocculant inlet configured to introduce a flocculant to the intermediate treated water produced in the selenium reduction tank before the intermediate treated water is fed into the membrane tank; and a recirculation line configured to recover a portion of the treated water discharged from the membrane tank and recycle the recovered treated water to the selenium reduction tank.

The reciprocating submerged membrane filtration system may further include: an anaerobic digester disposed upstream of the membrane tank and configured to biologically treat influent wastewater containing an organic compound by anaerobic digestion under anaerobic conditions to produce sludge and feed a supernatant above the sludge to the membrane tank.

The reciprocating submerged membrane filtration system may further include a recirculation line configured to recover a portion of the treated water discharged from the membrane tank and recycle the recovered treated water to the anaerobic treatment tank.

The reciprocating submerged membrane filtration system may further include a high-rate digester disposed upstream of the anaerobic digester and configured to mechanically agitate influent wastewater containing an organic compound in a mixer and heat the influent wastewater by a sludge heater to produce intermediate sludge and feed the intermediate sludge to the anaerobic digester, in which the high-rate digester constitutes a two-stage anaerobic digester together with the anaerobic digester.

The reciprocating submerged membrane filtration system may further include a recirculation line configured such that a portion of the treated water discharged from the membrane tank is mixed with the intermediate sludge discharged from the high-rate digester and is introduced into the anaerobic digester.

In accordance with an aspect of another exemplary embodiment, there is provided a reciprocating submerged membrane filtration apparatus including: a membrane tank including a submerged membrane and configured to intake influent wastewater to be treated, the influent wastewater being filtered through the submerged membrane to produce treated water; and a reciprocation apparatus configured to move the membrane to create an inertia force which shakes foulants off from the submerged membrane under oxygen-deficient conditions, wherein the submerged membrane includes a microfiltration (MF) membrane or an ultrafiltration (UF) membrane.

The submerged membrane may be configured to be reciprocated back and forth at a frequency of 2 Hz or less and an amplitude of 10 mm or more.

The submerged membrane may be configured to be reciprocated back and forth at a frequency of 1 Hz or less and an amplitude of 30 mm or more.

The submerged membrane may be configured to be reciprocated back and forth at a frequency of 0.5 Hz or less and an amplitude of 40 mm or more.

The submerged membrane may be reciprocated back and forth at a frequency of 0.2-0.5 Hz, and a flocculant inlet may be disposed upstream of the membrane tank so that both flocculation by a flocculant and filtration occurs in a single membrane tank.

The reciprocating submerged membrane filtration apparatus may further include a selenium reduction tank disposed upstream of the membrane tank and configured to biologically treat wastewater containing selenium oxide under anoxic or anaerobic conditions to produce intermediate treated water and to feed the intermediate treated water to the membrane tank.

The reciprocating submerged membrane filtration apparatus may further include a flocculant inlet configured to introduce a flocculant to the intermediate treated water produced in the selenium reduction tank before the intermediate treated water is fed into the membrane tank; and a recirculation line configured to recover a portion of the produced treated water discharged from the membrane tank and to recycle the recovered treated water to the selenium reduction tank.

The reciprocating submerged membrane filtration apparatus may further include an anaerobic digester disposed upstream of the membrane tank and configured to biologically treat influent wastewater containing an organic compound by anaerobic digestion under anaerobic conditions to produce sludge and to feed a supernatant above the sludge to the membrane tank.

The reciprocating submerged membrane filtration apparatus may further include a recirculation line configured to recover a portion of the treated water discharged from the membrane tank and to recycle the recovered treated water to the anaerobic treatment tank.

The reciprocating submerged membrane filtration apparatus may further include a high-rate digester disposed upstream of the anaerobic digester and configured to mechanically agitate influent wastewater containing an organic compound in a mixer, to heat the influent wastewater by a sludge heater to produce intermediate sludge and to feed the intermediate sludge to the anaerobic digester, in which the high-rate digester includes a two-stage anaerobic digester together with the anaerobic digester.

The reciprocating submerged membrane filtration apparatus may further include a recirculation line configured such that a portion of the treated water discharged from the membrane tank is mixed with the intermediate sludge discharged from the high-rate digester and is introduced into the anaerobic digester.

The reciprocation apparatus may include: a rotor connected to a sliding frame via a shaft; and a sliding frame connected to the submerged membrane, wherein the sliding frame is configured to reciprocate the submerged membrane.

The reciprocation apparatus may further include a motor connected to a pulley via a belt, the motor configured to rotate the rotor to generate rotational motion and convert the rotational motion into reciprocating motion of the sliding frame through the shaft.

The sliding frame may include: a damper provided between the sliding frame and the shaft so as to reduce shock load caused by reciprocating motion; and linear bearings and pillow block supports provided between the sliding frame and a slide rail such that the sliding frame is movable along the sliding rail via the linear bearings and pillow block supports.

BRIEF DESCRIPTION OF THE DRAWINGS

The above and/or other aspects of the disclosure will become apparent and more readily appreciated from the following description of the embodiments, taken in conjunction with the accompanying drawings of which.

DESCRIPTION OF REFERENCE NUMERALS USED IN THE DRAWINGS

10: influent;
20: mixed liquor flow;
21: flow from anaerobic tank to anoxic tank;
22: flow from anoxic tank to aerobic tank;
23: flow from aerobic tank to membrane tank;
24: flow from anoxic tank to anaerobic tank;
25: flow from anaerobic tank to aerobic tank;
30: activated sludge return;
31: activated sludge return (from membrane tank to anoxic tank);
32: internal recirculation (from anoxic tank to anaerobic tank);
33: activated sludge return (from membrane tank to anaerobic tank);
34: internal recirculation (from aerobic tank to anoxic tank);
40: effluent;
50: biological treatment train;
52: anoxic tank;
53: anaerobic tank;
60: membrane tank;
70: membrane or membrane cassette;
80: reciprocation apparatus;
90: sliding frame;
91: linear bearing with pillow block;
92: sliding rail;
93: membrane cassette connection point;
94: dampener;
100: rotor;
101: pulley;
102: belt;
103: low RPM motor;
110: shaft.

DETAILED DESCRIPTION

One or more exemplary embodiments relate to a submerged membrane filtration system that includes a mechanical apparatus for reciprocating a membrane cage (or membrane cassettes) back and forth. The mechanical apparatus eliminates the use of air scouring. Repetitive reciprocation of the membrane cage/cassette creates an inertia force acting on the membrane fibers, which shakes foulants off from the membrane surface. The system includes a membrane cage/cassette containing membrane modules that are submerged in either an aerobic tank or a separate membrane tank. The membrane cage/cassette can be mechanically reciprocated via reciprocation apparatus, which enable the disclosed membrane filtration system to be operated with higher flux and lower fouling than membrane filtration systems that use air scouring. Various mechanical means can be employed to create the reciprocating motion. The various details of the inventive concepts, and the manner in which they interrelate, are described in greater detail hereinafter.

Figure 1:
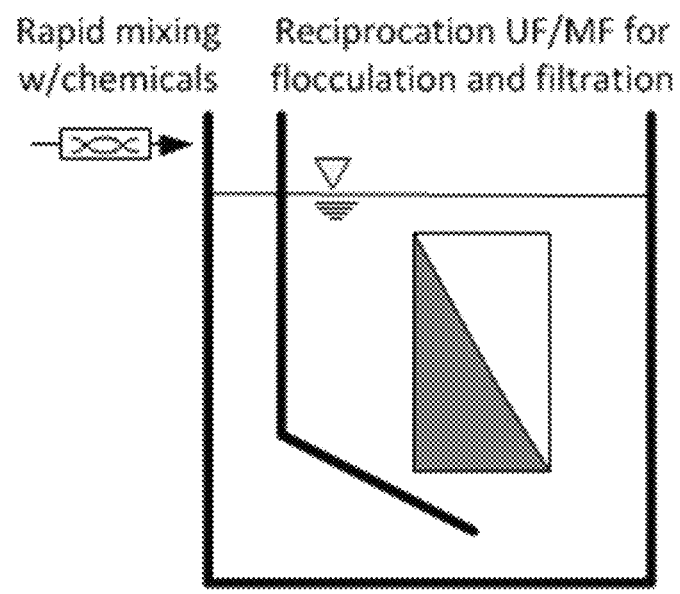
FIG. 1 is a process diagram illustrating a membrane filtration system according to an exemplary embodiment.

FIG. 1 illustrates basic components of the membrane filtration system according to an exemplary embodiment. The membrane filtration system includes: a membrane tank including a submerged membrane and configured such that influent wastewater is filtered through the membrane to produce treated water and the treated water is discharged; and a mechanical reciprocation apparatus configured to reciprocate the membrane back and forth to create an inertia force that shakes foulants from the surface of the membrane under oxygen-deficient conditions. Herein, the membrane may be a low-pressure microfiltration (MF) or ultrafiltration (UF) membrane that is used as a physical barrier for complete solid-liquid separation.

As mentioned above, in the process of cleaning membranes in conventional submerged UF/MF systems by air scouring, energy consumption is considerably high, and the cost of equipment for air scouring is also considerably high. For this reason, there is an increasing need for a membrane cleaning process that can achieve high energy efficiency and, at the same time, enables the maintenance of oxygen-deficient conditions.

To satisfy the above-identified shortfalls, the exemplary embodiments employ a process of cleaning membranes by shaking foulants off from the membranes by an inertia force generated by the back-and-forth motion of the membrane module, which is caused by slowly shaking the membrane module to reciprocate the membrane at low speed, instead of using the air scouring process.

The inventive concept of the disclosure has a distinctive characteristic in that it induces the membrane to reciprocate back and forth at low frequency and a relatively high amplitude such that the optimum inertia force is applied to the membrane. This reciprocation of the membrane according to the exemplary embodiments can substitute for conventional air scouring processes requiring high costs, high energy, high oxygen conditions and high-speed agitation conditions, and makes it possible to clean the membrane with high energy efficiency at low costs. Also, it makes it possible to maintain oxygen-deficient conditions so that the membrane process according to the exemplary embodiments can be efficiently combined with various anoxic or anaerobic biological treatment processes. In addition, because the membrane process according to one or more exemplary embodiments is operated under low-speed agitation conditions, both flocculation and mixing and both sedimentation and filtration, which can be said to be the basic and key elements of water treatment processes, can occur in a single tank, thus significantly reducing capital expenditures (CAPEX).

Figure 2:
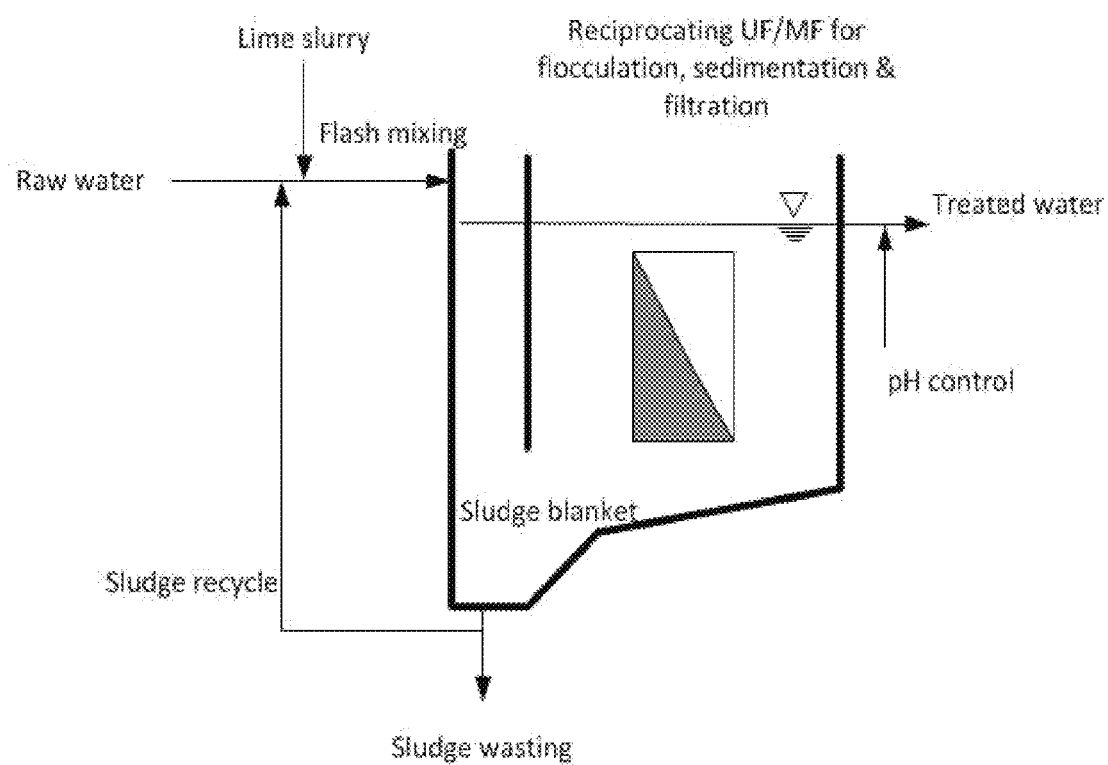
FIG. 2 is a diagram illustrating a single-stage softening process using a membrane filtration system according to an exemplary embodiment.
Figure 3:
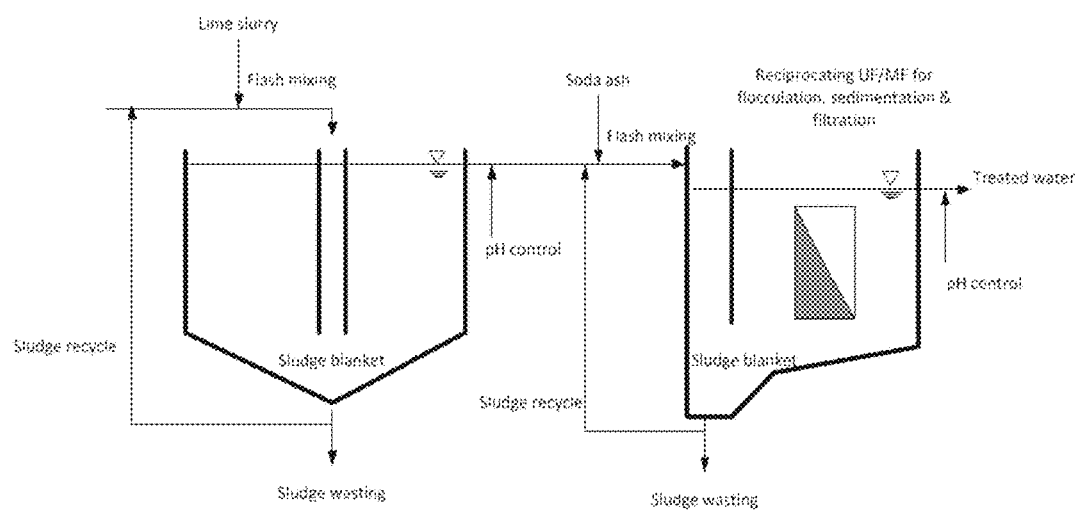
FIG. 3 is a diagram illustrating a two-stage softening process using a membrane filtration system according to an exemplary embodiment.

FIGS. 2 and 3 are diagrams illustrating a single-stage softening process and a two-stage softening process, respectively, which utilize a membrane filtration system according to exemplary embodiments. Herein, the softening process is a process of removing calcium, magnesium and other metal ions from hard water containing large amounts of metal ions. The metal bicarbonates, chlorides and sulfates contained in hard water can promote the formation of limescale in pipelines to block or corrode the pipelines. To remove metal ions from hard water, a flocculant is introduced into a rapid mixing tank and mixed with hard water. The mixed hard water is transferred into a flocculation tank, and metal ions in the hard water react with the flocculant to form floc. The floc-containing hard water is transferred into a membrane tank, and the hard water transferred to the membrane tank is filtered through the membrane connected to a reciprocation apparatus to produce treated water, and the floc contained in the hard water is sedimented to the bottom of the membrane tank. Thus, both sedimentation and filtration can occur in a single membrane tank, and a separate sedimentation tank does not need to be installed, thus reducing the area and cost of the equipment.

Because the membrane filtration system according to the exemplary embodiment employs the membrane cleaning process that allows the membrane to reciprocate back and forth at low frequency and high amplitude, it can be maintained under low-speed agitation conditions. Thus, while mixing and flocculation with a flocculant are performed such that a block suspension layer (i.e., sludge blanket) forming a boundary with an upper water layer in the tank is securely maintained, that is, the gradient of concentration of sludge along the height of the tank occurs. Thus, both flocculation and mixing and both sedimentation and filtration can occur in a single membrane filtration tank.

Meanwhile, the frequency and amplitude of reciprocation of the membrane should be selected by taking into consideration the kind of process applied, the state of raw water to be treated, the kind or amount of matter to be removed, etc., so that membrane cleaning can be effectively achieved by applying a sufficient inertia force to the membrane through reciprocation at low frequency and a relatively high amplitude. For example, when the reciprocation of the membrane is applied to an MBR system, the frequency of reciprocation is preferably about 0.5 Hz, and when the reciprocation of the membrane is applied to an UF system in which the amount of particles generated is small, the frequency of reciprocation can be reduced up to 0.2 Hz. When conventional water treatment processes are taken into consideration, a frequency of about 2 Hz and an amplitude of about 10 mm can be assumed to be the upper limit and the lower limit, respectively. However, the assumption of the lower limit is not greatly significant, because the present invention is principally characterized in that an inertia force is generated through reciprocation at low frequency and a relatively low amplitude as mentioned above.

Specifically, the lower limit of the frequency of membrane reciprocation is not greatly significant as mentioned above, and the reciprocation of the membrane may be performed at a frequency of 2 Hz or lower, preferably 1 Hz or lower, more preferably 0.5 Hz or lower, most preferably 0.3-0.5 Hz. This is because, at a frequency of 1 Hz or higher, problems can arise in terms of energy consumption and structural stability. The amplitude of membrane reciprocation may be 10 mm or higher, preferably 30 mm or higher, more preferably 40 mm or higher. The upper limit of the amplitude is not greatly significant as described above, but may be about 100 mm when taking into consideration energy economy and structural stability.

Although there is no absolute relationship between the frequency and amplitude of reciprocation of the membrane, there is a certain dependent relationship therebetween, and thus as the frequency decreases, the amplitude increases. However, the frequency and amplitude of membrane reciprocation may vary depending on the field of application, the tendency of membrane fouling, etc.

Figure 4:
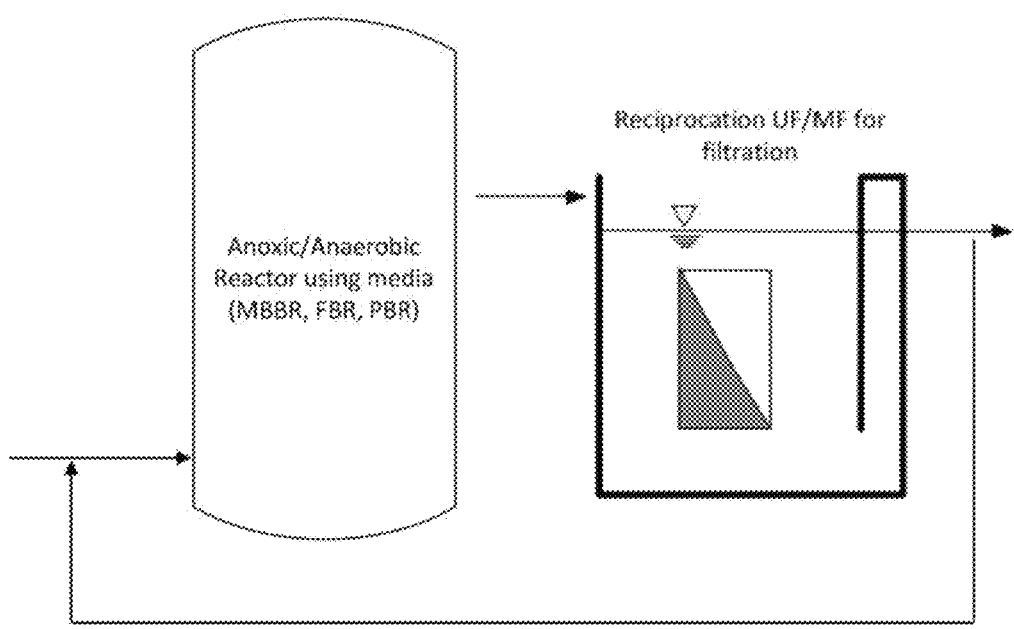
FIG. 4 is a diagram illustrating a process of removing selenium from flue gas desulfurization (FGD) wastewater using a membrane filtration system according to an exemplary embodiment;.

FIG. 4 is a diagram illustrating a process of removing selenium from wastewater, generated in a flue gas desulfurization (FGD) process, by use of the membrane filtration system according to an exemplary embodiment. In addition to flue gas desulfurization wastewater, wastewater generated in various coal industrial fields contains selenium compounds, and thus these selenium compounds need to be removed. Particularly, to remove selenium oxide, it should be reduced to elemental selenium and removed by filtration. For this purpose, bioreactors (i.e., selenium reduction tanks) such as MBBR, FBR or PBR, which use anoxic or anaerobic microorganisms, are used. When a flocculant is added to the intermediate treated water containing the reduced selenium and the intermediate treated water is then introduced into the membrane filtration system of the present invention, the selenium can be effectively removed by filtration. Also, even if foulants are generated on the membrane surface, these foulants can be removed by the inertia force generated by reciprocation of the membrane. In addition, because the membrane cleaning process according to the present invention is not an air scouring process so that the membrane filtration system will be maintained under oxygen-deficient conditions, water discharged from the membrane filtration system can be immediately recycled to the selenium reduction tank through a recirculation line. Thus, the membrane filtration system according to the present invention can significantly increase the treatment efficiency of the overall process.

Figure 5:
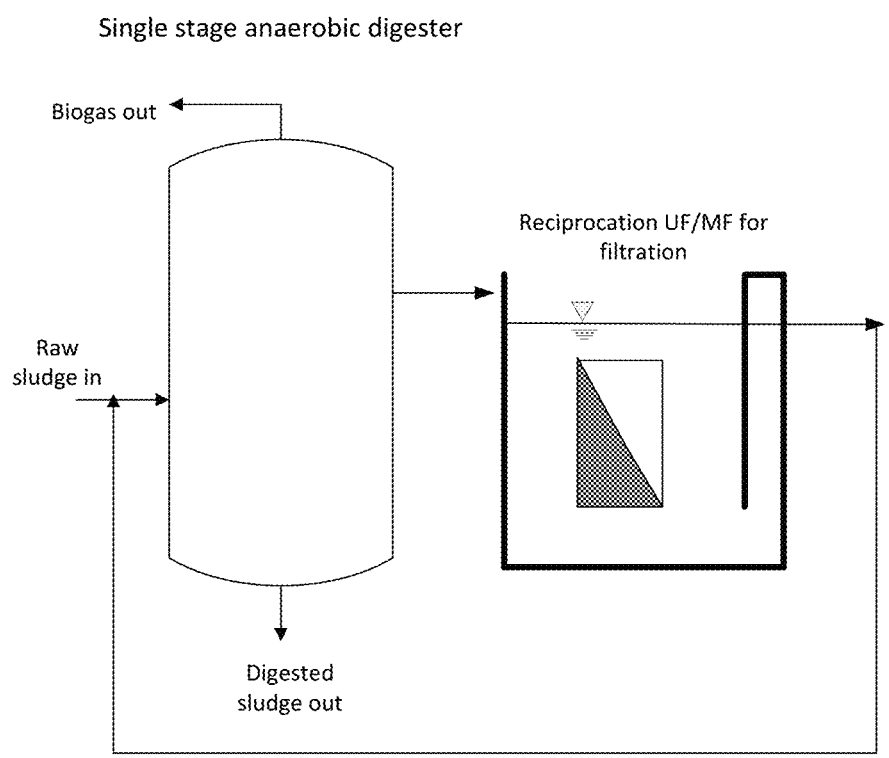
FIG. 5 is a diagram illustrating a single-stage anaerobic digester process using a membrane filtration system according to an exemplary embodiment.
Figure 6:
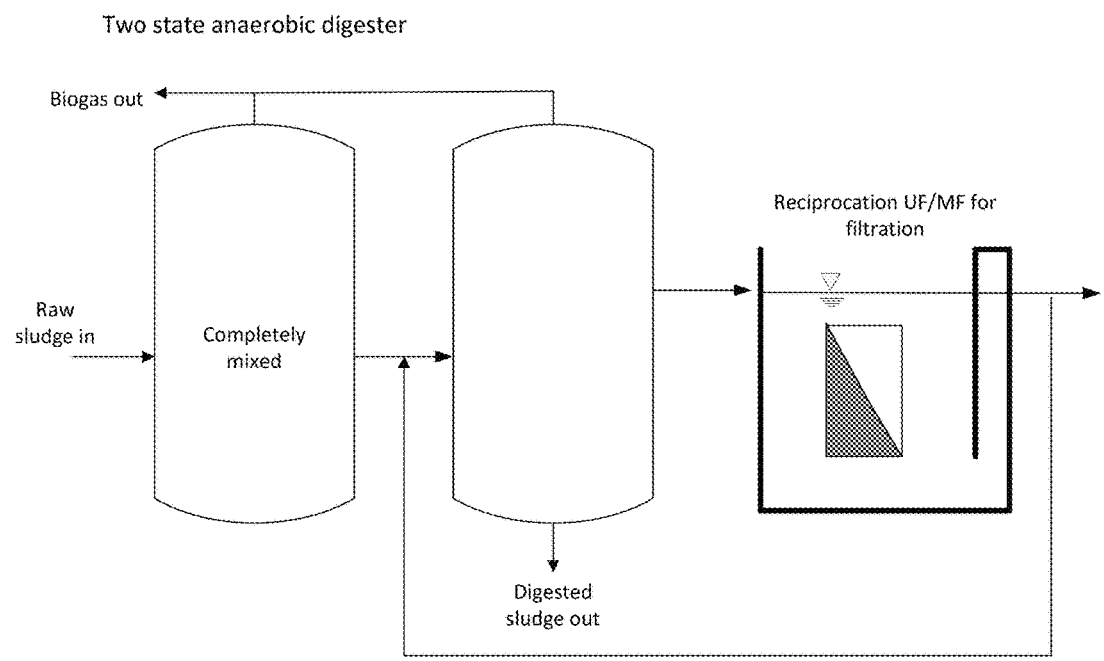
FIG. 6 is a diagram illustrating a two-stage anaerobic digester process using a membrane filtration system according to an exemplary embodiment.

FIGS. 5 and 6 are diagrams illustrating a single-stage anaerobic digester process and a two-stage anaerobic digester process, respectively, which include a membrane filtration system according to an exemplary embodiment. As mentioned above, the membrane filtration system of the exemplary embodiment can be operated while enabling oxygen-deficient conditions to be maintained. Thus, it is very suitable for combination for an anaerobic digester for decomposing and removing organic compounds. Specifically, upstream of the membrane tank, an anaerobic digester can be provided which is configured to biologically treat wastewater containing organic compounds by anaerobic digestion under anaerobic conditions to produce sludge while supplying a supernatant over the sludge to the membrane tank. As shown in FIG. 5, when raw water is introduced into the anaerobic digester, digested sludge is settled below an active digestion by biological action, and a supernatant and scum floating above the active digestion and gas is generated. The gas and the scum are separately removed, and the supernatant is transferred to the next stage. Herein, microorganisms present in the active digestion may be heated to promote metabolism. This process is herein referred to as the "single-stage process" or the "standard-rate process".

Alternatively, as shown in FIG. 6, two anaerobic digesters may be connected to each other in series and operated. Upstream of the membrane tank, a high-rate anaerobic digester is provided which is configured to mechanically agitate wastewater containing organic compounds by an agitator to increase the contact between the organic compounds and microorganism while heating the microorganisms by a sludge heater to increase the metabolic rate of the microorganisms to thereby increase digestion rate. Intermediate sludge discharged from the high-rate digester is introduced into the above-mentioned anaerobic digester. Thus, the digester disposed of the membrane tank is a two-stage anaerobic digester. This process is herein referred to as the "two-stage process" or the "high-rate process". In either the single-stage process or the two-stage process, a portion of water discharged from the membrane tank may be recycled.

Hereinafter, mechanical devices of a membrane filtration system according to exemplary embodiments together with a membrane bioreactor ("MBR") system employing the membrane filtration system will be described in detail.

One or more exemplary embodiments relate to a MBR system that includes a mechanical apparatus for reciprocating a membrane cage (or membrane cassettes) back and forth. The mechanical apparatus eliminates the use of air scouring. Repetitive reciprocation of the membrane cage/cassette creates an inertia force acting on the membrane fibers, which shakes foulants off from the membrane surface. The system includes a membrane cage/cassette containing membrane modules that are submerged in either an aerobic tank or a separate membrane tank. The membrane cage/cassette can be mechanically reciprocated via reciprocation apparatus, which enable the disclosed MBR system to be operated with higher flux and lower fouling than MBR systems that use air scoring. Various mechanical means can be employed to create the reciprocating motion. The various details of the present invention, and the manner in which they interrelate, are described in greater detail hereinafter.

Figure 7:
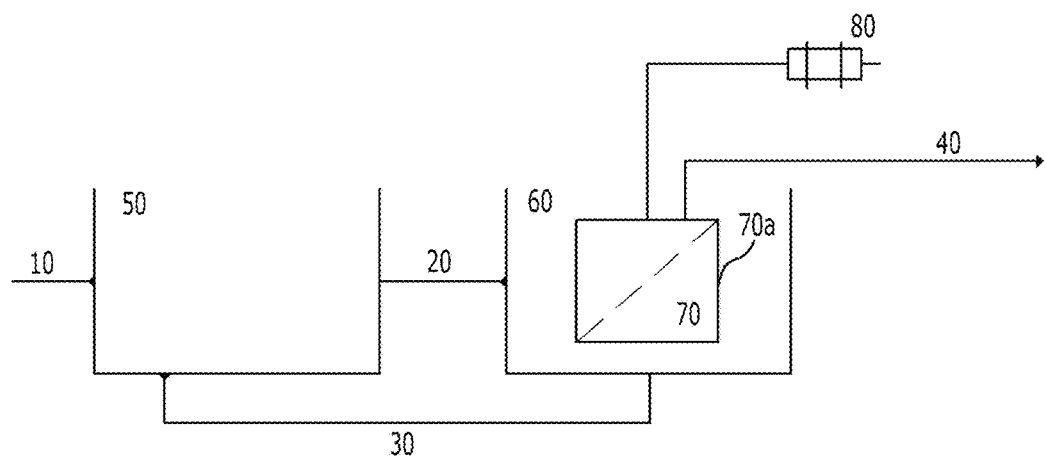
FIG. 7 is a membrane bioreactor (MBR) system process using a membrane filtration system according to an exemplary embodiment.

FIG. 7 illustrates components of a vibration MBR system according to an exemplary embodiment. The system includes a biological treatment train 50 for receiving influent 10 to be processed. Various anaerobic, anoxic, and aerobic biological treatment processes can be carried out within the treatment train 50. Mixed liquor 20 from the treatment train 50 is then passed into a membrane tank 60. The membrane tank 60 includes a submerged membrane 70 (or a series of membranes 70). The membrane(s) 70 may be, for example, a low pressure microfiltration (MF) or ultrafiltration (UF) membrane that is used as a physical barrier for complete solid-liquid separation. The membrane cage/cassette 70a is mechanically interconnected to a reciprocation apparatus 80. In accordance with the present invention, the reciprocation apparatus 80 is used to reciprocate the membrane 70. In the exemplary embodiment, the reciprocation apparatus 80 uses a mechanical device for converting rotational motion into reciprocating motion. Filtration through the membrane 70 in the membrane tank 60 produces effluent 40. The membrane 70 may be continually reciprocated during filtration. Alternatively, the membrane 70 can be selectively reciprocated as required in order to eliminate fouling. A portion of the activated sludge 30 (i.e. return activated sludge or "RAS") goes back to the biological treatment train 50 to maintain a sludge concentration within the train 50.

Figure 8:
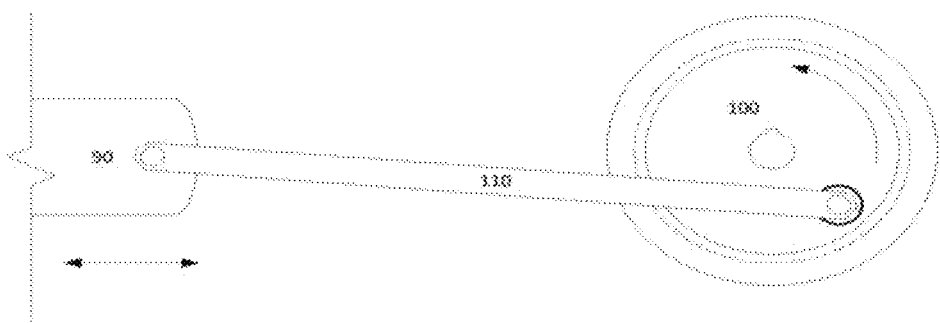
FIG. 8 is a mechanical reciprocation apparatus according an exemplary embodiment.

FIG. 8 illustrates a reciprocation apparatus 80 according to an exemplary embodiment. The membrane cage/cassette 70a can be connected to a sliding frame 90. A motorized rotor 100 is connected to the sliding frame 90 via a shaft 110. Thus, the reciprocation apparatus 80 according to the exemplary embodiment converts the rotational motion of the rotor 100 into the reciprocating motion of the sliding frame 90. The frequency of reciprocation will be dictated by the speed at which the rotor 100 is rotated.

Figure 9:
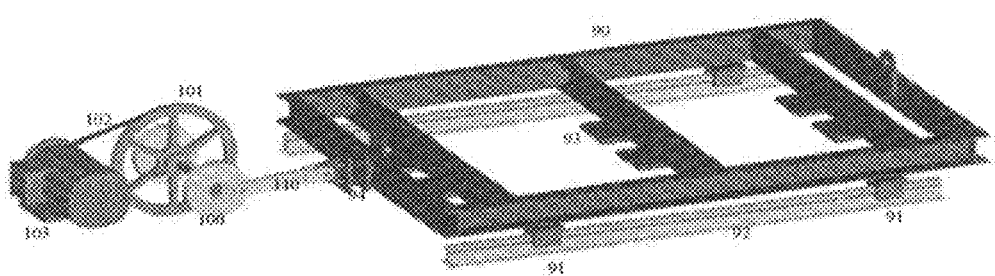
FIG. 9 is a detailed view of a mechanical reciprocation apparatus according an exemplary embodiment.
Figure 10:
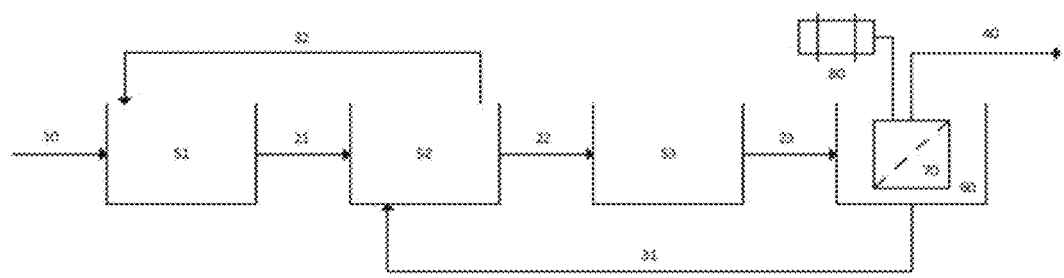
FIGS. 10 to 18 are process diagrams illustrating various alternative MBR processes according an exemplary embodiment.

A reciprocation apparatus is depicted in FIG. 9 according to an exemplary embodiment and the reciprocation apparatus includes a low RPM motor 103 connected to a pulley 101 via a belt 102 to convert rotational motion into the reciprocating motion of the sliding frame 90 through a shaft 110. Shock load due to reciprocating motion can be reduced by a dampener 94 in between the sliding frame 90 and the shaft 110. The sliding frame 90 can move along a sliding rail 92 with linear bearing and pillow block 91 supports (FIG. 9). There are many different types of mechanical equipment that can provide the required reciprocal motion. However, the exemplary embodiment is not limited thereto and one of ordinary skill in the art will appreciate other suitable mechanical devices after considering the inventive concept of the disclosure.

Various exemplary embodiments of a MBR process of are described in connection with FIGS. 10 to 18. With regard to FIG. 10, the system consists of a series of biological treatment tanks. The biological treatment tanks include an anaerobic treatment tank 51, an anoxic treatment tank 52, an aerobic treatment tank 53, and a membrane tank 60. The membrane 70 is submerged within the membrane tank 60 and can is reciprocated by the reciprocation apparatus 80.

The anaerobic treatment tank 51 receives influent 10 to be treated. Thereafter, the anaerobic treatment tank 51 biologically treats the influent in the absence of dissolved oxygen to release phosphorous for luxury uptake in the following aerobic conditions. In the anoxic tank 52, the wastewater is denitrified under oxygen-depleted conditions. Dissolved oxygen is excluded from the anoxic tank 52, although chemically bound oxygen may be present. Nitrification and luxury phosphorous uptake occur in the aerobic treatment tank 53 in the presence of dissolved oxygen. Filtration in the membrane tank 60 produces effluent 40.

There are two recirculation lines for the activated sludge. A line 31 delivers return activated sludge (or "RAS") from the membrane tank 60 to the anoxic tank 52. Additionally, an internal recycle line 32 delivers a portion of the activated sludge from the anoxic tank 52 to the anaerobic tank 51 to maintain mixed liquor suspended solids (or "MLSS"). In the present invention, RAS takes two roles in conventional activated sludge or MBR processes. In systems of the related art, the return flow of activated sludge from membrane tank contains dissolved oxygen ("DO"). Thus, in the systems of the related art, the activated sludge from the membrane tank could not be returned to the anoxic tank 52 or the anaerobic tank 51 due to the high amounts of dissolved oxygen effects on denitrification or phosphorous release. However, according to the exemplary embodiments, because physical membrane reciprocation is utilized instead of vigorous air bubbling, the DO in the RAS is minimal compared to the MBR of the related art. Therefore, only one sludge return line is required for both sludge and nitrate return in the present invention.

Figure 11:
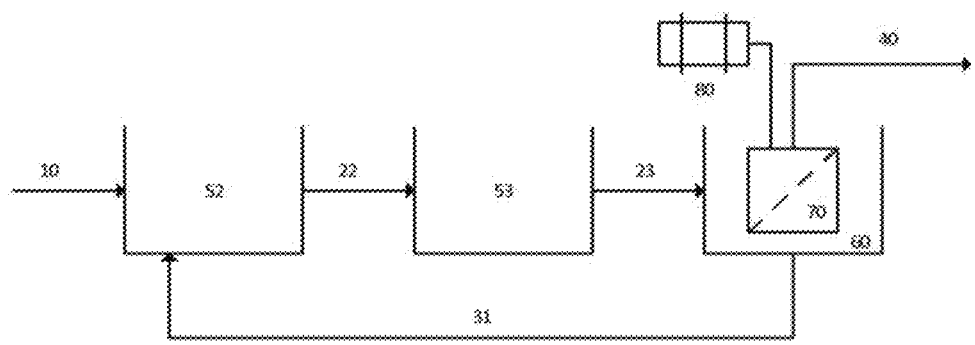
Figure 12:
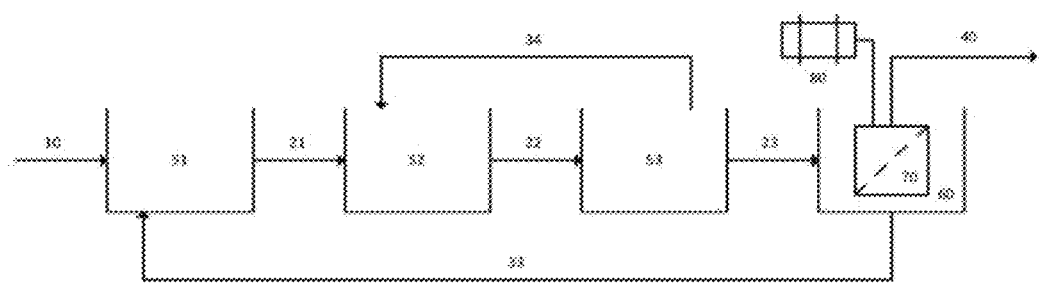
Figure 13:
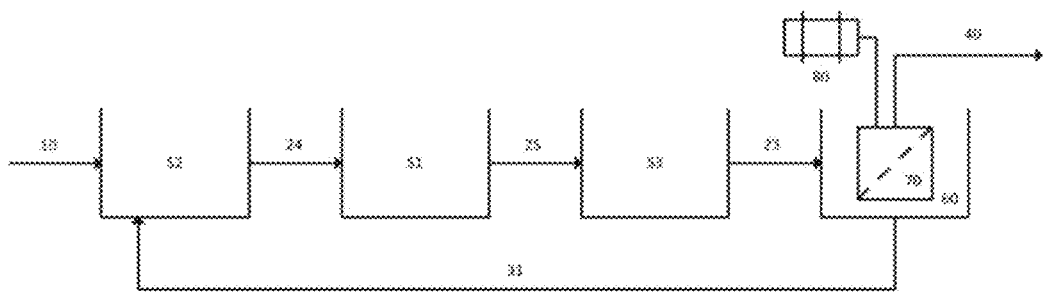
Figure 14:
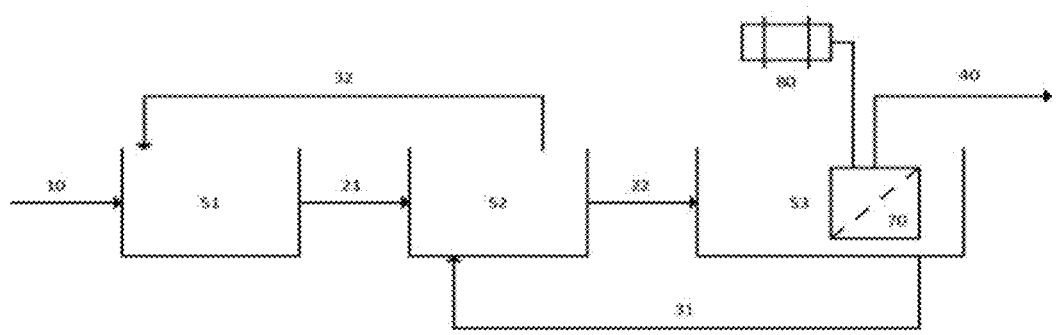
Figure 15:
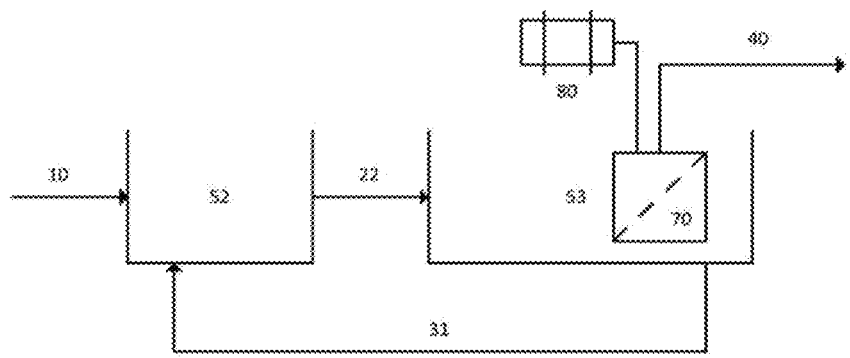
Figure 16:
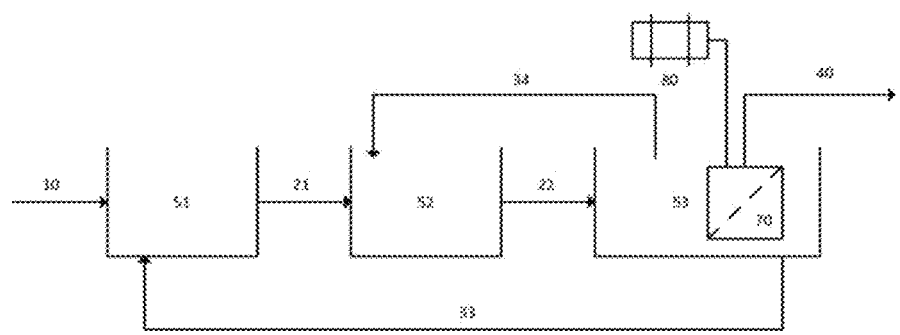
Figure 17:
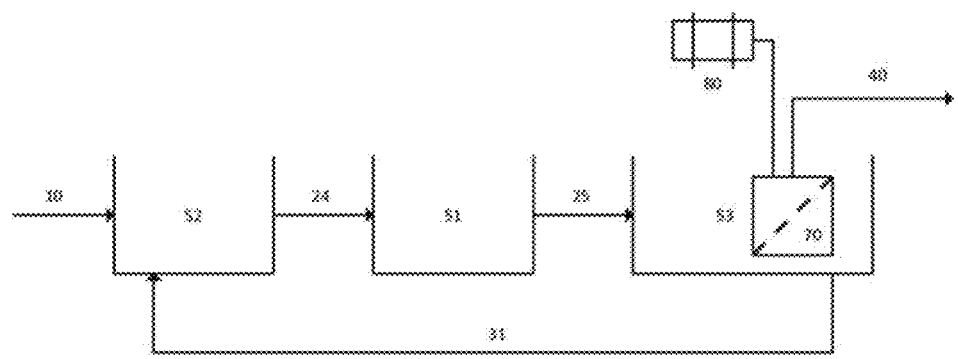
Figure 18:
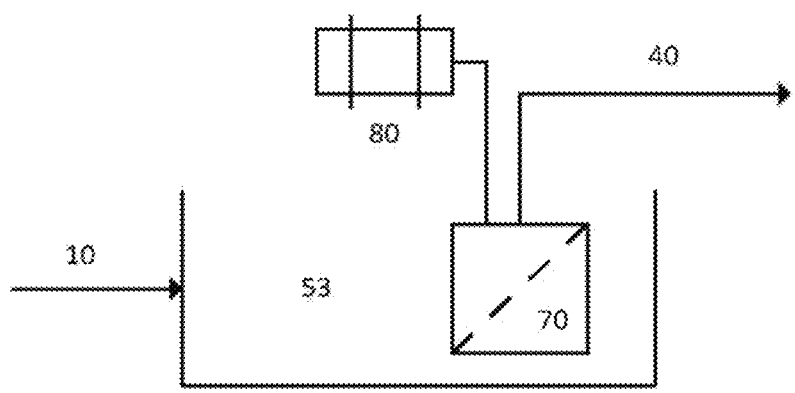

The system depicted in FIG. 11 includes the anoxic treatment tank 52 and the aerobic treatment tank 53, and is similar to the well-known Modified Ludzack and Ettinger (MLE) process. As described above, RAS 31 goes to the anoxic tank 52 directly from the membrane tank 60 for nitrate and sludge return. FIG. 12 represents an exemplary embodiment which includes the same reactors depicted in FIG. 10. However, return activated sludge 33 goes to the anaerobic treatment tank 51 and an internal recycle 34 is made in between the aerobic tank 53 and the anoxic tank 52. FIG. 13 illustrates an exemplary embodiment similar to the process described in FIG. 12. However, there is no internal recirculation and the RAS goes to the anoxic tank where denitrification occurred. FIGS. 14, 15, 16 and 17 are modified systems depicted in FIGS. 10, 11, 12 and 13, respectively. The difference is in the existence of the membrane tank. The systems in FIGS. 10 to 13 have a separate membrane tank 60, but the systems in FIGS. 14 to 17 do not have a separate membrane tank 60. Namely, tanks 53 in FIGS. 14 to 17 function as both a membrane tank and as a bioreactor. FIG. 18 shows an example of the processes which consists of simplest reactor configurations. A reciprocating membrane is submerged in a single bioreactor where both biological removal and membrane separation occur. The reactor can be an aerated tank, pond or sequencing batch reactor (SBR) where aerobic and anoxic conditions are made in cyclic sequence.

While exemplary embodiments have been particularly shown and described above, it would be appreciated by those skilled in the art that various changes may be made therein without departing from the spirit and scope of the present inventive concept as defined by the following claims.

What is claimed is:

1. A reciprocating submerged membrane filtration apparatus comprising:
   a membrane tank comprising a submerged membrane, the membrane tank configured to intake influent wastewater to be treated, the influent wastewater being filtered through the submerged membrane to produce treated water;
   a reciprocation apparatus configured to move the submerged membrane to create an inertia force which shakes foulants off from the submerged membrane under oxygen-deficient conditions; and
   a recirculation line configured to recover a portion of the produced treated water discharged from the membrane tank and to recycle the recovered treated water to a treatment tank disposed upstream of the membrane tank, the treatment tank configured to biologically treat the influent wastewater.

2. The reciprocating submerged membrane filtration apparatus of claim 1, wherein the submerged membrane is configured to be reciprocated back and forth at a frequency of 2 Hz or less and an amplitude of 10 mm or more.

3. The reciprocating submerged membrane filtration apparatus of claim 1, wherein the submerged membrane is configured to be reciprocated back and forth at a frequency of 1 Hz or less and an amplitude of 30 mm or more.

4. The reciprocating submerged membrane filtration apparatus of claim 1, wherein the submerged membrane is configured to be reciprocated back and forth at a frequency of 0.5 Hz or less and an amplitude of 40 mm or more.

5. The reciprocating submerged membrane filtration apparatus of claim 1, wherein the submerged membrane is reciprocated back and forth at a frequency of 0.2-0.5 Hz, and
   wherein a flocculant inlet is disposed upstream of the membrane tank so that both flocculation by a flocculant and filtration occurs in a single membrane tank.

6. The reciprocating submerged membrane filtration apparatus of claim 1, wherein the treatment tank comprises a selenium reduction tank configured to biologically treat wastewater containing selenium oxide under anoxic or anaerobic conditions to produce intermediate treated water and to feed the intermediate treated water to the membrane tank.

7. The reciprocating submerged membrane filtration apparatus of claim 6, further comprising:
   a flocculant inlet configured to introduce a flocculant to the intermediate treated water produced in the selenium reduction tank before the intermediate treated water is fed into the membrane tank.

8. The reciprocating submerged membrane filtration apparatus of claim 1, wherein the treatment tank comprises an anaerobic digester configured to biologically treat influent wastewater containing an organic compound by anaerobic digestion under anaerobic conditions to produce sludge and to feed a supernatant above the sludge to the membrane tank.

9. The reciprocating submerged membrane filtration apparatus of claim 1, wherein the treatment tank comprises a high-rate digester configured to mechanically agitate influent wastewater containing an organic compound in a mixer, to heat the influent wastewater by a sludge heater to produce intermediate sludge and to feed the intermediate sludge to the anaerobic digester, in which the high-rate digester comprises a two-stage anaerobic digester together with the anaerobic digester.

10. The reciprocating submerged membrane filtration apparatus of claim 1, wherein the submerged membrane comprises a microfiltration (MF) membrane or an ultrafiltration (UF) membrane.

11. A reciprocating submerged membrane filtration apparatus comprising:
a membrane tank comprising a submerged membrane, the membrane tank configured to intake influent wastewater to be treated, the influent wastewater being filtered through the submerged membrane to produce treated water; and
a reciprocation apparatus configured to move the submerged membrane to create an inertia force which shakes foulants off from the submerged membrane under oxygen-deficient conditions,
wherein the reciprocation apparatus comprises:
a rotor connected to a sliding frame via a shaft; and
a sliding frame connected to the submerged membrane, wherein the sliding frame is configured to reciprocate the submerged membrane.

12. The reciprocating submerged membrane filtration apparatus of claim 11, wherein the reciprocation apparatus further comprises a motor connected to a pulley via a belt, the motor configured to rotate the rotor to generate rotational motion and convert the rotational motion into reciprocating motion of the sliding frame through the shaft.

13. The reciprocating submerged membrane filtration apparatus of claim 11, wherein the sliding frame comprises:
a damper provided between the sliding frame and the shaft so as to reduce shock load caused by reciprocating motion; and
linear bearings and pillow block supports provided between the sliding frame and a slide rail such that the sliding frame is movable along the sliding rail via the linear bearings and pillow block supports.

* * * * *